United States Patent
Biasin

(10) Patent No.: US 10,247,333 B2
(45) Date of Patent: Apr. 2, 2019

(54) SELF OPENING CLAMP

(71) Applicant: GM GLOBAL TECHNOLOGY OPERATIONS LLC, Detroit, MI (US)

(72) Inventor: Valter Biasin, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 16 days.

(21) Appl. No.: 15/485,989

(22) Filed: Apr. 12, 2017

(65) Prior Publication Data

US 2018/0299048 A1 Oct. 18, 2018

(51) Int. Cl.
*F01N 3/20* (2006.01)
*F16L 23/08* (2006.01)
*F01N 13/18* (2010.01)

(52) U.S. Cl.
CPC ............ *F16L 23/08* (2013.01); *F01N 3/2066* (2013.01); *F01N 13/1805* (2013.01); *F01N 2450/18* (2013.01); *F01N 2450/24* (2013.01); *F01N 2610/1453* (2013.01)

(58) Field of Classification Search
USPC .......... 60/272, 274, 286, 295, 297, 301, 303
See application file for complete search history.

(56) References Cited

U.S. PATENT DOCUMENTS

| | | | | |
|---|---|---|---|---|
| 3,705,737 A | * | 12/1972 | Westerlund | F16L 23/06 24/271 |
| 6,996,976 B2 | * | 2/2006 | Rumminger | F01N 13/008 204/421 |
| 7,703,421 B2 | * | 4/2010 | Merchant | F01P 3/16 123/41.31 |
| 8,495,986 B2 | * | 7/2013 | Reba | B23P 6/00 123/470 |
| 9,512,944 B1 | * | 12/2016 | Buzdum | F16L 23/06 |
| 9,651,179 B2 | * | 5/2017 | Krueger | F16L 33/04 |
| 2007/0234568 A1 | * | 10/2007 | Knoblauch | F16L 23/06 29/890.14 |
| 2010/0038903 A1 | * | 2/2010 | Linhorst | F16L 21/005 285/365 |
| 2011/0101687 A1 | * | 5/2011 | Heelan, Jr. | F16L 21/065 285/409 |
| 2013/0097815 A1 | | 4/2013 | Henrich et al. | |
| 2013/0111708 A1 | | 5/2013 | Wachter et al. | |

* cited by examiner

*Primary Examiner* — Binh Q Tran
(74) *Attorney, Agent, or Firm* — Lorenz & Kopf, LLP

(57) ABSTRACT

An apparatus is provided for fixing two parts together. The apparatus includes a clamp having a first half shell, a second half shell and a fastener mechanism. The first half shell includes an extension. The second half shell includes an opening to receive the extension of the first half shell. The extension of the first half shell includes a stopper for maintaining an open position of the first half shell and the second half shell. The fastener mechanism is configured for moving the first half shell and the second half shell into a closed position such that the stopper is forced through the opening. The second half shell includes the opening to receive the extension of the first half shell for prohibiting rotation of first and second half shells relative to one another when the clamp is open.

20 Claims, 3 Drawing Sheets

SELF OPENING CLAMP

TECHNICAL FIELD

The present disclosure generally relates to a clamp for connecting two parts to each other, and more particularly relates to a clamp that is maintained in an open state for ease of assembly and even more particularly a clamp that prevents the rotation between two halves of the clamp.

BACKGROUND

Clamps are currently used to fix parts together in a vehicle. A clamp design which simplifies the assembly of parts can have significant effects on production time and production costs of a vehicle. In some assembly operations, parts are hardly accessible and connectable. Clamps are desirably operable in a simple and quick way.

Accordingly, it is desirable to provide a clamp which is operable in a simple and quick way to connect to parts to each other. Furthermore, other desirable features and characteristics of the invention will become apparent from the subsequent detailed description and the appended claims, taken in conjunction with the accompanying drawings and the foregoing technical field and background.

SUMMARY

A clamp is provided. In one embodiment, the clamp includes a first half shell, a second half shell and a fastener mechanism. The first half shell includes an extension. The second half shell includes an opening to receive the extension of the first half shell. The extension of the first half shell includes a stopper for maintaining an open position of the first half shell and the second half shell. The fastener mechanism is configured for moving the first half shell and the second half shell into a closed position such that the stopper is forced through the opening.

A system is provided for fixing an injector to an after treatment device and includes an after treatment device, an injector and the clamp. The after treatment device includes a mount for receiving the injector, on which a clamp is used for fixing the injector to the mount of the after treatment device.

A vehicle is provided for integrating the system for fixing an injector to an after treatment device.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
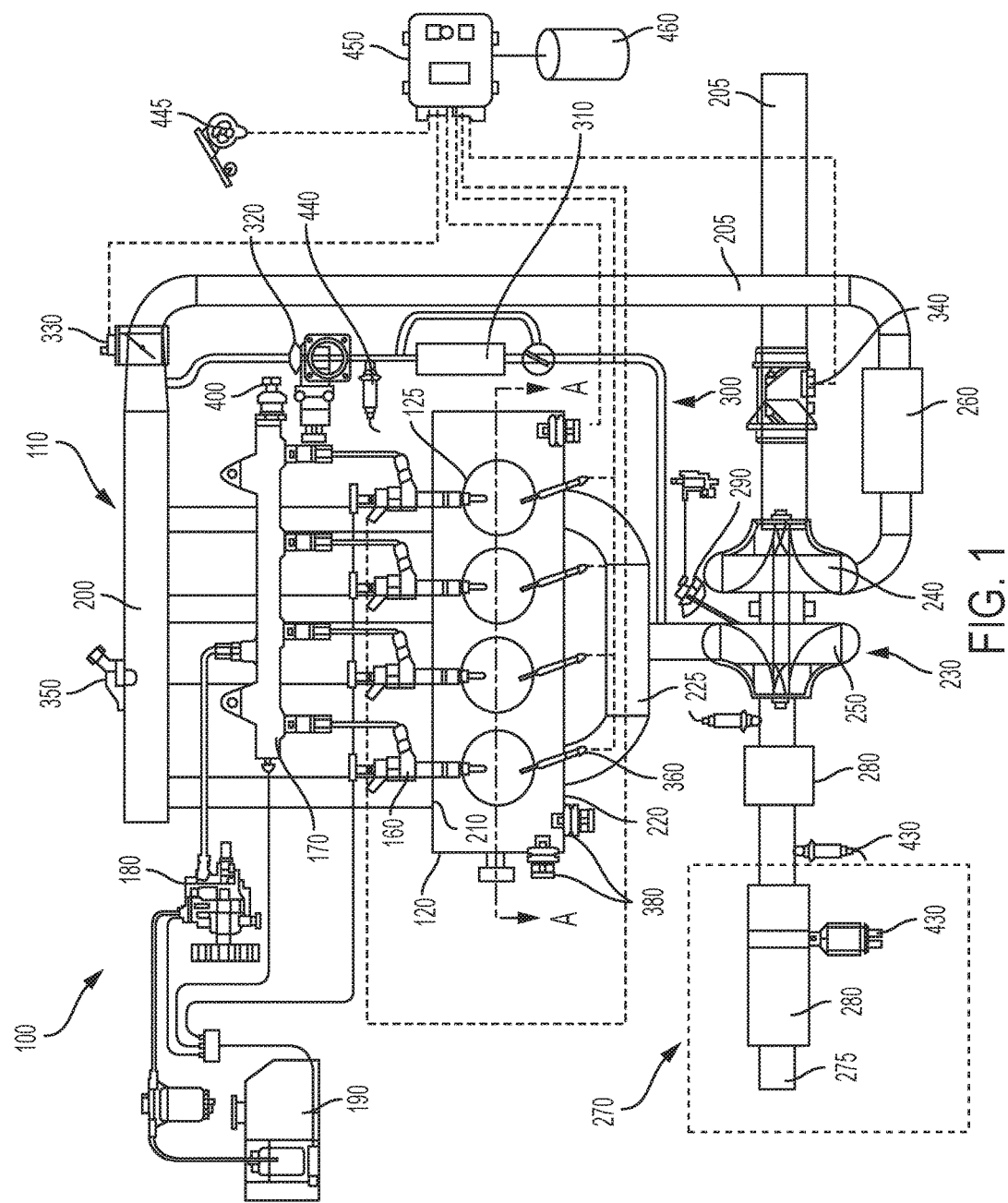
FIG. 1 schematically shows an automotive system according to an embodiment of the present disclosure.

Some embodiments may include an automotive system 100, as shown in FIG. 1, having an internal combustion engine (ICE) 110 with an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters, such as a Selective Catalytic Reduction on Filter (SCRF) 500. The SCRF 500 may be associated with a temperature sensor upstream of the SCRF 500 and temperature sensor downstream of the SCRF 560.

Other embodiments may include a high pressure exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

Other embodiments may include also a low pressure exhaust gas recirculation (EGR) system 600.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 2:
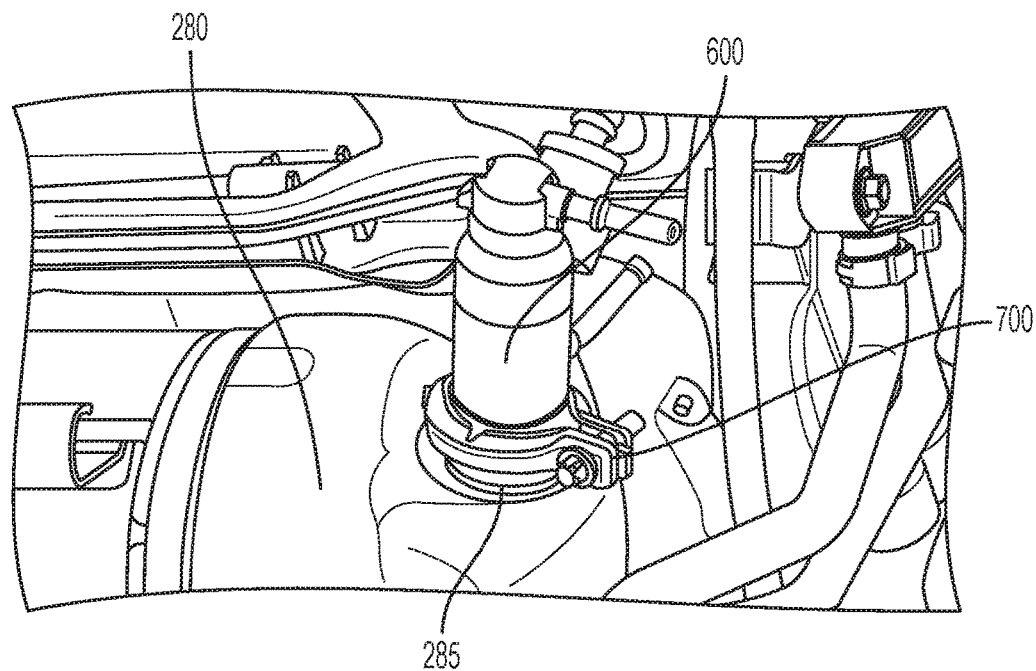
FIG. 2 is a detailed view of an injector connected to an exhaust pipe by a clamp belonging to the automotive system of FIG. 1.

FIG. 2 shows an injector 600 connected to an after treatment device 280 with a clamp 700, which will be explained in more detail in FIGS. 3, 4 and 5. In an example, the injector 600 can be a urea injector connected to the mount of an aftertreatment device 285 in a Diesel engine. The embodiment of FIG. 2 shows one example application of clamp of the present disclosure. The clamp 700 can be used in numerous applications for connecting components together, particularly vehicle components. In embodiments, the clamp 700 can be used for fixation of fluid delivery part to a mount of another part.

Figure 3:
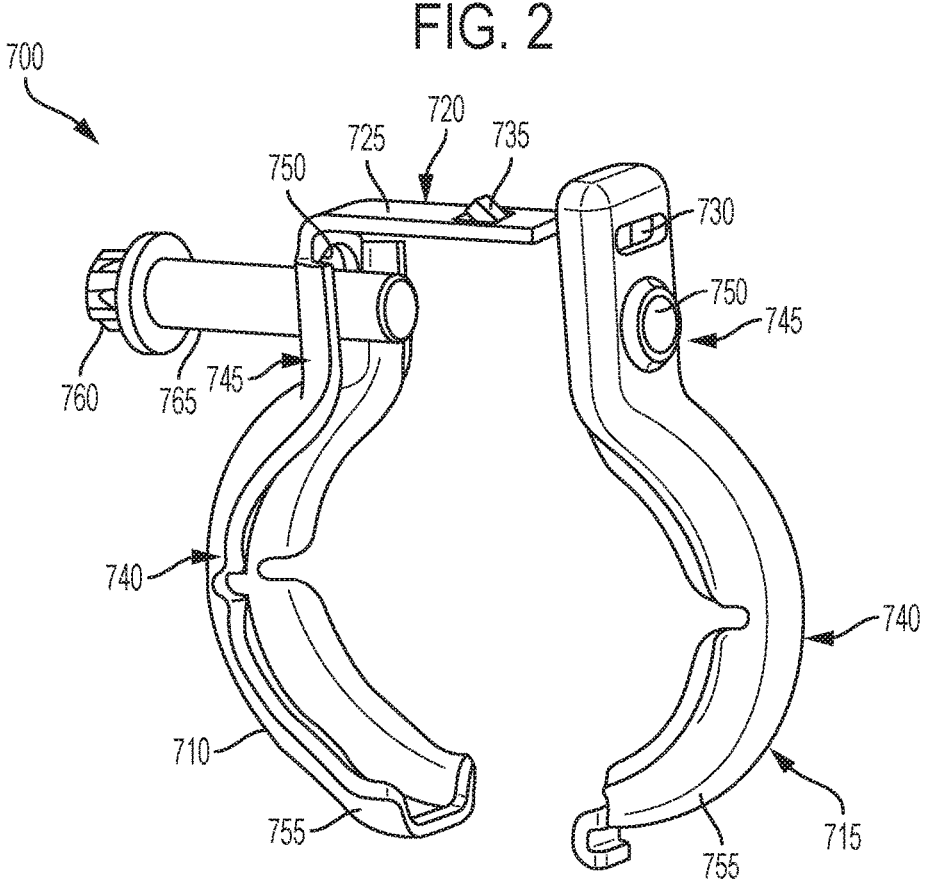
FIG. 3 is an exemplary embodiment of a clamp in a non-assembled configuration.

FIG. 3 shows an exemplary embodiment of a clamp 700 in a non-assembled configuration. The clamp includes a first half shell 710, a second half shell 715 and a fastener mechanism 720. The first half shell includes an extension 725. The second half shell includes an opening 730 to receive the extension of the first half shell. The extension 725 of the first half shell includes a stopper 735 for maintaining an open position of the first half shell 710 and the second half shell 715, as shown in FIG. 4. The fastener mechanism 720 is configured for moving the first half shell 710 and the second half shell 715 into a closed position such that the stopper 735 is forced through the opening 730.

In the exemplary embodiments shown in FIG. 3, the first half shell 710 and the second half shell 715 includes an arcuate part 740, a straight part 745, and a hole 750. The hole can be provided as a bore hole. The hole is arranged on the straight part 745. The straight part and the arcuate part are built of one piece. The straight part 745 is position at one end of the arcuate part and extends radially outwardly from the arcuate part 745. The fastener mechanism 720 or fastener is used to bring the two half shells 710, 715 together. The extension 725 can be an integrated part of the first half shell 710 and extends at least partially in a longitudinal direction of the fastening mechanism. In an exemplary embodiment, the fastener mechanism 720 is a threaded fastener which is threaded into the holes 750. The threaded fastener 720 may include a tool engaging head 760 and a threaded shaft 765.

In an exemplary embodiment, the stopper 735 is an integrated part of the extension 725. The extension is, in embodiments, designed as a protuberance relative to a surface of the extension 725. The protruding aspect of the stopper 735 functions as a projection inhibiting the second half shell 715 to move further towards the first half shell 710 unless the second half shell 715 is forced by fastening the threaded fastener 720 and deflecting, permanently or temporarily, the projection 745 so as to be able to pass through the opening 730. In other words, the stopper 735 on the extension in combination with the fastener mechanism maintains that the two shells are delivered in an open position, which is shown in FIG. 4. The stopper 735 is shaped so as to define an angled side facing the opening 730 when the clamp 700 is in the open state shown in FIG. 4 and a more abruptly transitioned side facing the opening 730 when the clamp 700 is in the closed state shown in FIG. 5. In this way, the angled side can ease passage of the stopper 735 through the opening 730 when being forced therethrough to close the clamp 700 and can resist passage of the stopper 735 through the opening 730 so as to inhibit re-opening of the clamp 700 once it is in the closed state of FIG. 5.

Figure 4:
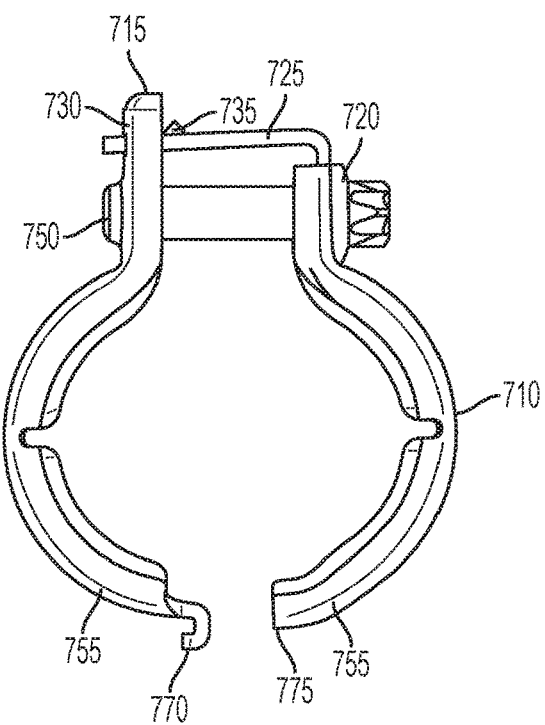
FIG. 4 is an exemplary embodiment of a clamp in an open position.

In an exemplary embodiment as shown in FIGS. 3 and 4, the cross section of the extension 725 is rectangular or otherwise shaped (e.g. any non-rotationally symmetrical shape) to prevent the first half shell 710 to rotate relative to the second half shell 715. The opening 730 of the second half shell 715 is configured as a through hole matching the cross section of the extension. The cross section can be of any other form, preventing the extension 725 to rotate in the through hole 730. The extension 725 of the first half shell 710 and the opening 730 of the second half shell 715 are arranged so as to align the lower ends 755 of the first half shell 710 and the second half shell 715 to each other.

In embodiments, the arcuate part 740 or semi-circle part is configured to surround a cylindrically shaped part to be fixed. The part to be fixed may be an injector or other fluid transportation component to a tank or after treatment device 280 or another component in a vehicle. In an example, the arcuate parts 740 of the first half shell 710 and the second half shell 715 are arranged to cooperate to enclose a circle or other annular shape in a closed position.

Figure 5:
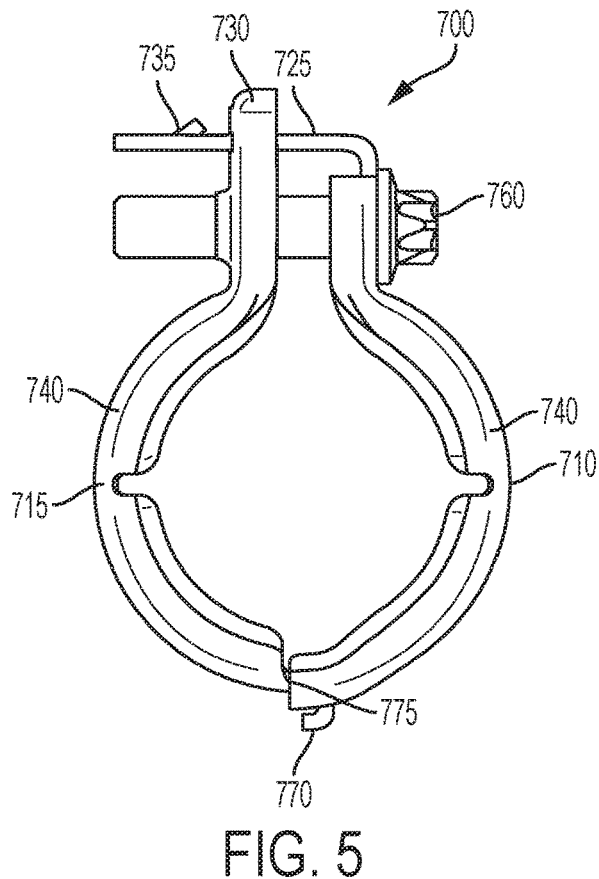
FIG. 5 is an exemplary embodiment of a clamp in a closed position.

Further, the half shells 710, 715 are configured to be releasably fixed to each other at lower ends 755 of the first half shell 710 and the second half shell 715, as shown in FIG. 5 for defining, in cooperation with the fastener mechanism 720, the closed position of the half shells 710, 715. In an example, the lower end of the first half shell 710 includes a hook 770 and the lower end of the second half shell 715 includes a hook opening 775. The hook 770 and the opening 775 are one example embodiment for a latch mechanism for releasably securing the lowers ends 755 of the half shells 710, 715 to one another.

In an open position shown in FIG. 4, the extension 725 is entered into the opening 730 and the threaded fastener 720 is threaded until the stopper 735 acts against, i.e. abuts, the portion of the second half shell 715 around the opening 730. In the open state of FIG. 3, the clamp 700 is provided in a self-opened arrangement to the assembly staff. The protuberance 735 of the extension 725 is configured for maintaining the first half shell 710 and the second half shell 715 spaced apart from each other. In the open position, the extension 725 is received in the opening 730, whereby the non-rotational shape match between the extension 725 and the opening 730 prevents accidental rotational. Further, the threaded engagement of the fastener 720 and the threaded bore 750 of the second half shell inhibits the first and second half shells 710, 715 from coming apart. The stopper or protuberance 735 defines a spaced configuration for the associated shell sections 710, 715. The lower ends 755 of the first half-shell 710 and the second half-shell 715 are not connected in the open position with the hook 770 of the second half shell 715 and the hook opening 775 of the first half shell 715 unconnected and spaced from each other. In the open configuration, the lower ends 755 of the half shells 710 and 715 can be further opened and placed around a part to be fixed, such as a vehicle part. This self-opened arrangement provided additionally by the protuberance 735 and the opening 730, allows manufacturing personnel to connect the clamp 700 to a mount of a vehicle, e.g. a connection of an injector 600 to a tank 280 in a fast and easy manner, which improves the assembly efficiency and thus will reduce the assembly lead-time- FIG. 5 shows the first and second half shells 710, 715 in a closed position. The first and second half shells 710, 715 have been placed around a part to be fixed. Lower ends 755 of the half shells 710, 715 are secured to one another by a latch mechanism embodied in FIG. 5 by the hook 770 and the hook opening 775 arranged on the lower ends 755 of the shells 710, 715. Then, the threaded fastener 720 is fastened until the two half shells are brought together into a closed position for clamping against a vehicle part that is to be fixed by the clamp 700. The stopper 735 of the extension 725 is pressed through the opening 730 of the second half shell 715. In other words, the stopper 735 has moved beyond the opening 730 by resilient or permanent deformation. The thread fastener 720 has been fastened so that the associated shell sections 710, 715 are in tight contact. In case the fastener mechanism 720 is fastened to close the shells 710, 715, the stopper 735 abuts against the portion of the second half shell 715 around the opening 730 and is forced to pass through the opening 730. The arcuate parts 740 of the first half shell 710 and the second half shell 715 are arranged to each other to enclose a form or mount of the part to be fixed. In an example embodiment, the form can be a circle in case cylindrically shaped part is to be fixed, such as an injector 600. Other annular shapes are contemplated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A clamp positionable between an open position and a closed position, the clamp comprising:
   a first half shell having an opening;
   a second half shell having an extension with a stopper for maintaining the open position, wherein the opening is configured to receive the extension in the closed position; and
   a fastener mechanism configured to move the first half shell and the second half shell into the closed position such that the stopper is forced through the opening.

2. The clamp according to claim 1, wherein the first half shell and the second half shell each comprise an arcuate part, a straight part, and a hole.

3. The clamp according to claim 2, wherein each of the holes comprise a bore hole.

4. The clamp according to claim 2, wherein the fastener mechanism comprises a connection bolt configured for insertion into the bore holes of the first half shell and the second half shell for bringing the two half shells together when fastened.

5. The clamp according to claim 2, wherein the arcuate parts of the first half shell and the second half shell are arranged to circumscribe a circle in the closed position.

6. The clamp according to claim 1, wherein the extension extends at least partially in a longitudinal direction of the fastening mechanism.

7. The clamp according to claim 1, wherein the extension of the first half shell and the opening of the second half shell are arranged so as to align lower ends of the first half shell and the second half shell to each other.

8. The clamp according to claim 1, wherein the extension comprises a member having a rectangular cross-section and the opening corresponds to the rectangular cross-section.

9. The clamp according to claim 1, wherein the faster mechanism is a threaded fastener.

10. The clamp according to claim 1, wherein the stopper comprises a protuberance.

11. The clamp according to claim 10, wherein the protuberance of the extension is configured to maintain the first half shell and the second half shell spaced apart from each other in an open position of the shells and pass through the opening as the fastener mechanism has been fastened in a closed position of the shells.

12. The clamp according to claim 1, wherein the stopper is configured to abut against the portion of the second half shell around the opening when the fastener mechanism is fastened to close the half shells before being the stopper is forced to pass through the opening.

13. The clamp according to claim 1, wherein the first and second half shells are fixable on lower ends thereof which in cooperation with the fastener mechanism define the closed position of the shells.

14. The clamp according to claim 13, wherein the lower end of the first half shell comprises a hook and the lower end of the second half shell comprises a mating hook opening.

15. The clamp according to claim 1, wherein the extension is received in the opening in the open position of the clamp and wherein the extension and opening cooperate to prevent the rotation of the first and second half shells when the clamp is open.

16. A system for fixing an injector to an after treatment device, comprising:
- an after treatment device having a mount configured to receive an injector;
- an injector at least partially located in the mount; and
- a clamp configured to fix the injector to the mount of the after treatment device, the clamp including:
  - a first shell half shell having an opening;
  - a second half shell having an extension with a stopper for maintaining the open position, wherein the opening is configured to receive the extension in the closed position; and
  - a fastener mechanism configured to move the first half shell and the second half shell into the closed position such that the stopper is forced through the opening.

17. The system according to claim 16, wherein the extension of the first half shell and the opening of the second half shell are arranged so as to align the lower ends of the first half shell and the second half shell to each other.

18. The system according to claim 16, wherein the cross section of the extension is rectangular to prevent rotation of the first half shell relative to the second half shell.

19. A vehicle comprising:
- an engine with an exhaust system including an after treatment device having a mount configured to receive an injector;
- an injector at least partially located in the mount; and
- a clamp configured to fix the injector to the mount of the after treatment device, the clamp including:
  - a first half shell having an opening;
  - a second half shell having an extension with a stopper for maintaining the open position, wherein the opening is configured to receive the extension in the closed position; and
  - a fastener mechanism configured to move the first half shell and the second half shell into the closed position such that the stopper is forced through the opening.

20. The vehicle according to claim 19, wherein the cross section of the extension is rectangular to prevent rotation of the first half shell relative to the second half shell.

* * * * *